US005666079A

United States Patent [19]

Ma

[11] Patent Number: 5,666,079
[45] Date of Patent: Sep. 9, 1997

[54] BINARY RELATIVE DELAY LINE

[75] Inventor: James Hsioh Cheng Ma, San Jose, Calif.

[73] Assignee: PLX Technology, Inc., Sunnyvale, Calif.

[21] Appl. No.: 239,044

[22] Filed: May 6, 1994

[51] Int. Cl.⁶ ............................................. H03H 11/26
[52] U.S. Cl. ........................ 327/276; 327/277; 327/278; 327/284; 327/403
[58] Field of Search ........................ 327/270, 271, 327/272, 273, 276, 277, 278, 279, 284, 285, 286, 290, 291, 292, 403, 141, 99

[56] References Cited

U.S. PATENT DOCUMENTS

| | | | |
|---|---|---|---|
| 4,105,979 | 8/1978 | Kage | 327/115 |
| 4,330,750 | 5/1982 | Mayor | 327/277 |
| 4,337,433 | 6/1982 | Yoshimura | 327/270 |
| 4,354,124 | 10/1982 | Shima et al. | 327/12 |
| 4,494,021 | 1/1985 | Bell et al. | 327/262 |
| 4,626,716 | 12/1986 | Miki | 327/270 |
| 4,737,670 | 4/1988 | Chan | 327/278 |
| 4,745,310 | 5/1988 | Swapp | 327/279 |
| 4,800,304 | 1/1989 | Takeuchi | 327/160 |
| 4,845,390 | 7/1989 | Chan | 327/278 |
| 4,868,522 | 9/1989 | Popat et al. | 331/2 |
| 4,956,797 | 9/1990 | Berard | 327/291 |
| 4,958,362 | 9/1990 | Nishibe et al. | 377/20 |
| 4,999,526 | 3/1991 | Dudley | 327/152 |
| 5,079,519 | 1/1992 | Ashby et al. | 331/1 A |
| 5,095,233 | 3/1992 | Ashby et al. | 327/149 |
| 5,121,010 | 6/1992 | Hoshizaki et al. | 327/3 |
| 5,128,554 | 7/1992 | Hoshizaki | 327/147 |
| 5,173,617 | 12/1992 | Alsup et al. | 327/158 |
| 5,204,555 | 4/1993 | Graham et al. | 326/46 |
| 5,216,301 | 6/1993 | Gleeson, III et al. | 327/119 |
| 5,218,314 | 6/1993 | Efendovich et al. | 327/152 |
| 5,237,224 | 8/1993 | Delisle et al. | 327/279 |
| 5,258,660 | 11/1993 | Nelson et al. | 327/261 |
| 5,272,729 | 12/1993 | Bechade et al. | 375/371 |
| 5,309,035 | 5/1994 | Watson, Jr. et al. | 327/141 |
| 5,317,202 | 5/1994 | Walzman | 327/156 |
| 5,359,232 | 10/1994 | Eiterbeim et al. | 327/116 |
| 5,371,416 | 12/1994 | Atriss et al. | 327/145 |
| 5,389,830 | 2/1995 | Buckingham et al. | 364/703 |
| 5,394,024 | 2/1995 | Buckenmaier et al. | 327/160 |
| 5,550,514 | 8/1996 | Liedberg | 327/141 |

FOREIGN PATENT DOCUMENTS 1301261  4/1988  Canada.

OTHER PUBLICATIONS

Transactions on Circuits and Systems—1: Fundamental Theory and Applications, vol. 41, No. 2, Feb. 1994 "A New Method for Clock Distribution".

Primary Examiner—Timothy P. Callahan
Assistant Examiner—Kenneth B. Wells
Attorney, Agent, or Firm—Fish & Richardson P.C.

[57] ABSTRACT

A binary relative delay line device having two delay lines, each of which delays, during a time interval, an input signal by a substantially equal amount of time. Each delay line requires a settling time before it is selected during a next time interval. A selection and delay determining circuit is coupled to the two delay lines to select one of them to provide an output signal. A clock is coupled to the selection and delay determining circuit to operate the selection and delay determining circuit at a lower frequency than the frequency of the input signal, the lower frequency being chosen so that any selected delay line has settled before it is selected.

4 Claims, 13 Drawing Sheets

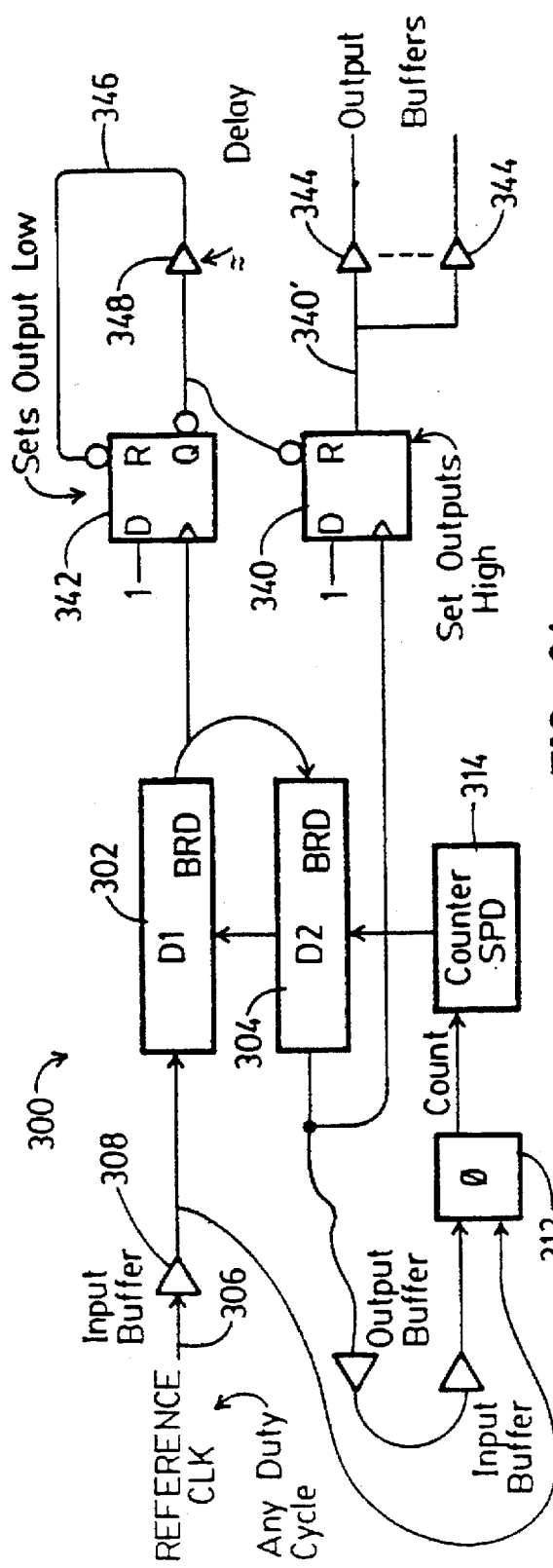
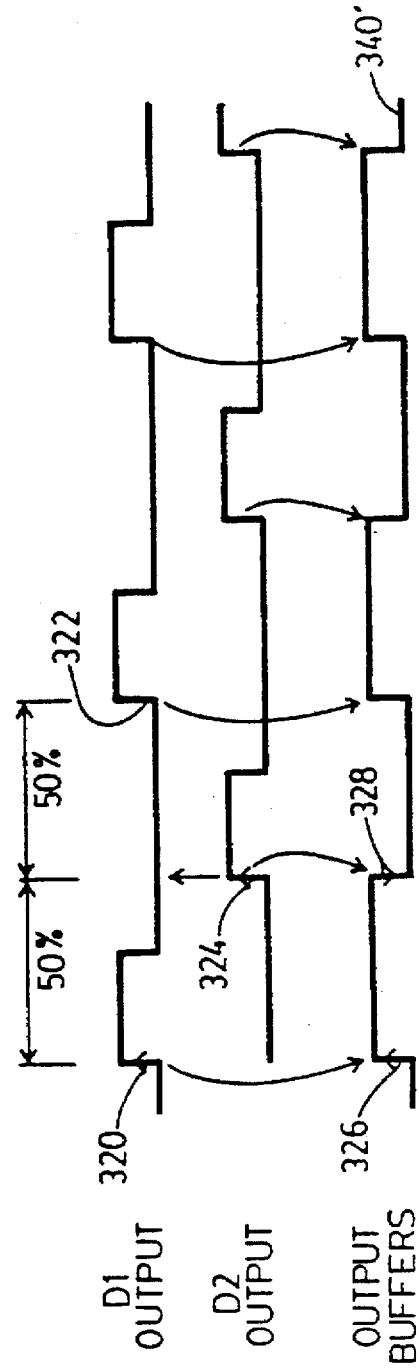
FIG. 9A.
FIG. 9B.

BINARY RELATIVE DELAY LINE

BACKGROUND OF THE INVENTION

This invention relates in general to clock distribution circuits and, in particular, to a new topology of clock distribution wherein clock skew is minimized and other delay line circuits.

Clock signals are repetitive digital pulses, usually derived from a crystal oscillator, with a constant period of repetition or frequency. Clock signals are used in digital systems to synchronize operations between groups of digital gates, time events, and to control the buffering of data and control signals. Due to the large number of digital elements which require clocks in a typical digital system, there are usually multiple copies of the clock signals. These multiple copies of the clocks are produced and distributed by the clock distribution network. The clock distribution network is usually composed of wires, printed circuit board traces, and integrated circuit (IC) buffers. It is very important that the copies of the clock signals be distributed so that all receivers of the clocks receive them at the same time. The differences in arrival time of the various copies of the clock signals are referred to as clock skew. In general, the greater the amount of clock skew, measured in nanoseconds or picoseconds, the greater the loss of system bandwidth and reduction in system operations per second.

Traditionally, clock skew has been controlled by careful measurement and adjustment of the clock distribution network. Wires and PC board traces have been manually adjusted to specific lengths and specially graded integrated circuits used to insure close alignment of the clocks. This was necessary because all integrated circuits have significant variations in propagation delay from IC to IC due to intrinsic semiconductor manufacturing process variations. While a single IC can provide a small number of clocks with very low skew, a clock distribution network composed of more than one IC will have significant skew due to the variation between ICs.

More recently, clock distribution ICs have been developed which use active compensation techniques to automatically adjust for this intrinsic semiconductor process variation. These ICs are based on the use of the phase lock loop (PLL) method. The PLL contains an internal oscillator which is adjusted until its frequency, or a subdivision, of oscillation matches that of an external input reference clock signal. The oscillator output also drives some number of the IC outputs. The practical effect is that the PLL ICs appear to have zero propagation delay since the output clock signals appear almost at the same time as the input reference clock signal. Since the PLL clock distribution IC appears to have zero propagation delay, the task of producing a precise clock distribution network is greatly simplified. As long as all wires and PC board traces in the network are matched, the zero delay PLL ICs will not contribute any variations to the resultant multiple clock copies. Thus, multiple clock copies with low skew can be produced.

However, PLL clock distribution ICs suffer from a number of limitations which prevent the above ideal scenario from being achieved. PLL ICs have the fundamental problem of trying to distribute clocks by independently generating new clocks and then trying to adjust all of the new clocks to the desired reference clock. This integrated circuit design approach has two requirements: generating a new clock and adjusting the new clock to the reference clock.

The first requirement of generating a stable, low noise and high frequency clock in an integrated circuit is difficult. The use of precise high frequency, typically 300 to 800 MHz, analog oscillator circuits is necessary. This requires a semiconductor process which is capable of producing precise high frequency analog circuits. Compounding the difficulties is the vulnerability to noise by analog circuits. Analog circuits are much more vulnerable to noise compared to digital circuits due to uniform linear response instead of digital's binary threshold response to noise. Stable low noise oscillators typically will work only over a limited range of frequencies.

The second requirement of adjusting this sensitive high frequency analog oscillator to the desired reference clock is also very difficult. The adjustment circuits are typically composed of a phase detector to measure the mismatch between the newly generated clock and the desired reference clock and a filtered charge pump to control the internal oscillator. The phase detector outputs two pulses, the widths of which are used to control the charge pump. The charge pump is ideally a precise symmetrical analog circuit which provides a uniform linear amount of current to the oscillator in response to the widths of the two control pulses. Again, the demands of the precision analog circuits are hard to meet.

Additional problems with PLL ICs include high power consumption due to the high frequency internal oscillator, inability to handle sudden change in clock frequency, lack of control over duty cycle, and difficulty in layout on a printed circuit board.

It is therefore desirable to provide an improved clock distribution circuit whereby the above-described difficulties are not present.

SUMMARY OF THE INVENTION

The family of clock distribution circuits of this invention has been developed to distribute high precision clocks without any of the problems of the PLL approach. The circuits can distribute large numbers of low skew clock signals, provide higher multiples and subdivisions of reference clocks, and control duty cycles of output clocks. The basic approach of the clock distribution circuits of this invention is based on the recognition that, by distributing the desired clocks as opposed to regenerating new clocks and then trying to adjust the new clocks to match the desired clocks, it is then unnecessary to provide high frequency analog circuits and associated special semiconductor processes. By eliminating such requirement, a host of advantages becomes possible.

The first advantage is that all circuits can be digital. This means that any semiconductor process capable of supporting digital circuits can be used to implement the circuits of this invention. Any library of macros/gates supported by a specific semiconductor process can be used to implement these circuits.

The second advantage is the continuous clock frequency range which may be distributed by the circuits of this invention. From zero MHz up to the maximum MHz, which the selected semiconductor process is capable of, may be distributed. This continuous frequency support is not possible with PLL ICs.

The third advantage is the inherent noise tolerance of digital circuits over analog circuits. The circuits of this invention are less susceptible to noise than PLL circuits, especially if differential gates are used. Differential gates switch when the paired complementary inputs cross each other. Common mode noise is effectively rejected by differential gates. Voltage and temperature fluctuations in a digital system will not affect the circuits. No special analog power planes or isolation is needed in PC board layout.

The fourth advantage is the reduction in power consumption. Without a high frequency internal oscillator to consume power, any implementation of the circuits of this invention can offer substantial power savings over a similar PLL circuit. The circuits of this invention never switch any faster than the desired output clock frequencies.

The fifth advantage is the ability to distribute with arbitrary duty cycles. Since no new clocks are generated with the circuits of this invention, the desired clocks may have any variation in duty cycle. What comes into the circuits of this invention clock distribution network is what goes out. In contrast, PLL approach always generates clocks of approximately 50% duty cycle.

In addition to the above advantages, the clock distribution IC circuits of this invention reduce clock skew, input to output delay, and control clock edges to sub 100 picosecond intervals. Unique circuit configurations leverage the inherent uniformity and consistency of semiconductor and printed circuit (PC) board processing to reduce variations in the clocks being distributed.

A clock distribution network using the circuits of this invention ICs can provide a large number of clock copies with less skew than PLL ICs. The circuits of this invention can also provide a more ideal zero delay buffer than PLL ICs with tighter and symmetrical tolerance. The use of self-calibrating topology in the circuits of this invention makes it possible for any semiconductor process to precisely control clock edges with finer resolution than what the individual macros/gates are otherwise capable of.

One aspect of the invention is directed towards an apparatus for deriving n reference clock signals from an input clock signal for use in a sequence of n circuit devices from the first device to the nth device, n being a positive integer. The apparatus comprises an elongated connector having a proximal portion receiving said input clock signal and a distal portion spaced from the proximal portion so that said input clock signal reaches the distal portion a time delay after the input clock signal is applied to the proximal portion. The direction of propagation of the input clock signal from the proximal portion to the distal portion defines a downstream direction and a direction opposite to the downstream direction defining an upstream direction. The apparatus comprises n pairs of connections, each pair connecting one of the n devices to the connector at two corresponding locations, a proximal location, and a distal location between the proximal and distal portions, each distal location being downstream from any proximal location, and each two locations corresponding to a device forming a group. The proximal location in the ith group is downstream from the proximal location in the (i−1)th group and the distal location in the ith group is upstream from the distal location in the (i−1)th group, i being an integer in a range from 2 to n, so that each device receives from said connector an early clock signal from said proximal location of its corresponding group and a late clock signal from said distal location of its corresponding group, such early and late clock signals forming a pair of signals corresponding to each said device. The apparatus further comprises a source of n clock signals, each clock signal being derived from a corresponding pair of signals corresponding to a device, wherein clock skew between the n clock signals is reduced.

Another aspect of the invention is directed towards a binary relative delay line comprising two substantially identical interconnect signal paths, means for selecting one of the two paths for passing a signal to delay the signal, and gate means connected to one of the two paths to increase the delay caused by said one path compared to the other path.

Yet another aspect of the invention is directed towards a binary relative delay line comprising a plurality of stages arranged in a sequence. Each stage includes two substantially identical interconnect signal paths, a selector selecting one of the two paths for passing a signal to delay the signal, and to provide an output and a load connected to one of two paths to increase the delay caused by said one path compared to the other path. The output of the selecting means of each stage except for the last stage is supplied to both signal paths of the next stage in the sequence.

Still another aspect of the invention is directed towards a binary relative delay line comprising two substantially identical interconnect signal paths, means for selecting one of the two paths for passing a signal to delay the signal, and to provide an output and means for monitoring the path currently selected. The monitoring means causes said selecting means to select a path that is not currently selected in response to an external signal.

An additional aspect of the invention is directed towards a circuit for converting an input digital periodic signal having a cycle time to one at the same frequency with a ratio of (m/n) 100% duty cycle, m and n being positive integers where n is greater than m. The circuit comprises means for delaying a rising or falling edge of an input signal by m/n or (n−m)/n of the cycle time of the input signal to obtain a corresponding delayed edge of a delayed signal and means for providing a periodic signal that changes logic state upon the rising or falling edge of the input signal and upon the corresponding edge of the delayed signal.

Another aspect of the invention is directed towards a circuit for generating a clock signal with a frequency that is a multiple of frequency of an input signal, comprising a plurality of delay lines introducing substantially identical delays and connected in series, said series of delay lines receiving at one end said input signal, each delay line providing an output. The circuit further comprises means responsive to change in logic state of the output of each of the delay lines to provide a pulse signal and means for combining the pulses to provide said clock signal.

A last aspect of the invention is directed towards a symmetrical phase detector comprising a first and a second source of signal delay for delaying an input signal and a reference signal respectively to provide a delayed input signal and a delayed reference signal, a first logic element providing a lag signal in response to receipt of both the delayed input signal and the reference signal, and a second logic element providing a lead signal in response to receipt of both the input signal and the delayed reference signal. The detector further comprises a third logic element providing an output in response to the lead and lag signals to indicate whether the input and reference signals are in phase.

Another aspect of this invention is that it delivers substantial performance and cost benefits when implemented as part of a larger integrated circuit which contains functions besides clock distribution such as a microprocessor, memory or other logic. When implemented in this manner, it delivers all the same performance benefits as when implemented as a stand-alone chip (i.e., dedicated clock chip) plus some other significant benefits.

First, unlike an analog PLL, the invention requires no analog circuitry, analog bower and ground or analog layout rules. Therefore, it may be implemented using the same digital gates from the same library and the same layout rules as the rest of the logic in the integrated circuit. This will reduce the cost of the larger integrated circuit because generic digital circuit processes may be used. For example, a chip designer who is designing a logic device using a generic CMOS gate array may implement this invention, whereas it would be impossible to implement a PLL solution in a CMOS gate array.

Second, given the same chip process technology, the circuit of this invention delivers much higher performance than the PLL. This enables the manufacturer of the larger IC to achieve much higher clocking performance than with a PLL, and allows him to avoid using amore expensive technology for his entire circuit just to achieve higher clocking performance.

BRIEF DESCRIPTION OF THE DRAWINGS

FIG. 9A is a block diagram of a delay line circuit to illustrate an embodiment of the invention where a desired duty cycle output clock signal may be generated from an input clock signal.

FIG. 9B is a timing diagram illustrating the operation of the circuit of FIG. 9A.

For simplicity in description, identical parts or signals in the figures of this application are labeled by the same numerals.

DETAILED DESCRIPTION OF THE PREFERRED EMBODIMENT

Figure 1:
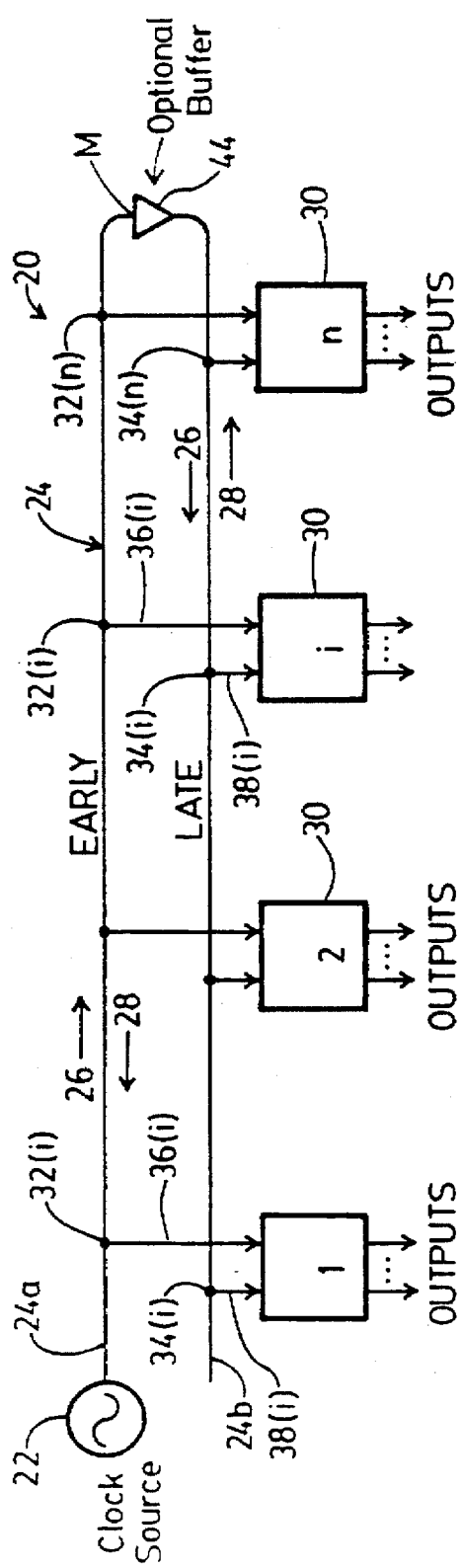
FIG. 1 is a block diagram of a clock distribution network illustrating a new topology for generating a plurality of clock signals with low skew between them to illustrate an embodiment of the invention.

FIG. 1 is a block diagram of a clock distribution circuit to illustrate the generation of low skew clock signals. As shown in FIG. 1, a clock distribution circuit 20 includes a clock source 22 supplying an input clock signal to an elongated connector 24 having a proximal portion 24a and a distal portion 24b. The clock source supplies an input clock signal to the proximal portion 24a so that the input clock signal propagates along connector 24 to the distal portion 24b a time delay after the input clock signal is applied to the proximal portion. The direction of propagation of the input clock signal from the proximal portion to the distal portion defines a downstream direction 26 and a direction 28 opposite to the downstream direction defining an upstream direction. As shown in FIG. 1, each of the n devices 30 is connected through a pair of connections to connector 24 at two locations, a proximal location, and a distal location. Thus, the ith device is connected to the connector at a proximal location $32(i)$ through a connection carrying signal $36(i)$ and at a distal location $34(i)$ through a connection carrying signal $38(i)$, where i ranges from 1 through n. Thus, for each device, such as the ith device, there is a corresponding group such as the ith group of two locations, a proximal location and a distal location, such as locations $32(i)$, $34(i)$. The locations $32(i)$, $34(i)$ form the ith group corresponding to the ith device. It will be observed that for all the proximal and distal locations and the n devices, each distal location is downstream from any proximal location and the proximal location in the ith group is downstream from the proximal location in the (i−1)th group and the distal location in the ith group is upstream from the distal location in the (i−1)th group, where i in this instance is an integer in a range from 2 to n. Thus, each of the n devices receives from the connector an early clock signal from the proximal location of its corresponding group and a late clock signal from the distal location of its corresponding group, such early and late clock signal forming a pair of signals corresponding to said each device. Thus, the ith device 30 would receive an early clock signal through location $32(i)$ and a late clock signal through location $34(i)$.

Figure 2:
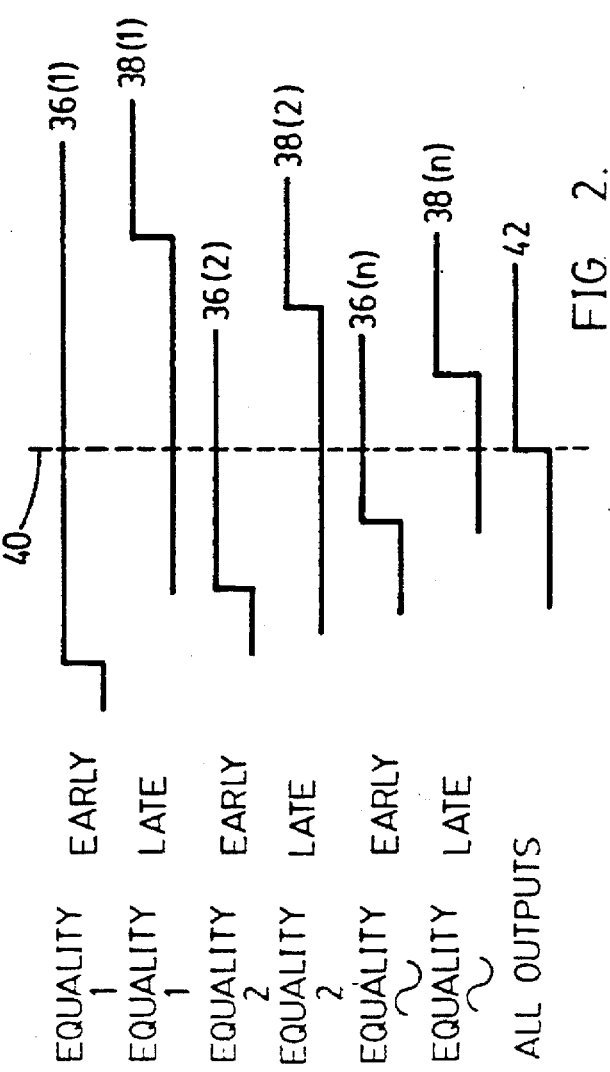
FIG. 2 is a timing diagram illustrating how the low skew clock signals are generated in the circuit of FIG. 1.

FIG. 2 is a timing diagram illustrating the operation of the circuit of FIG. 1. As shown in FIGS. 1 and 2, due to the topology of the circuit in FIG. 1, device 1 receives an early signal $36(1)$ that is received at a time before the corresponding early signal is received by any of the other devices; however, the late signal $38(1)$ received by device 1 occurs at a time later than the receipt of the corresponding late signal by any of the other devices. For each of the n devices, the midpoint between the transition times of the early and late signals it receives gives an average mean value of the early and late clock signals received by the device. If it is assumed that connector 24 is uniform and introduces a delay proportional to its length so that the distance of a proximal or distal location from the proximal portion 24a is proportional to the amount of delay introduced to the early or late signal obtained from such location, and assuming that the actual layout of the circuit 20 of FIG. 1 in a semiconductor medium is such that, for each device such as the ith device, the distance between the proximal location $32(i)$ and a common midpoint or reference point M of connector 24 is substantially equal to the distance between M and the distal location $34(i)$, i ranging from 1 to n, then the mean clock signal times between the early and late signals for each device would match and occur at the same time, where such time is indicated by the dotted line 40 in FIG. 2. If each of the n devices 30 includes a circuit for generating one or more output signals 42 having a transition time occurring at a mean value between the transition times of the early and late clock signals of the n devices, then all of the n output signals provided by the n devices will occur at substantially the same time, despite the spatial separation of the n devices. An optional buffer 44 may be included in connector 24 separating the proximal and distal locations.

As described above, in order for the mean value of the transition times of the early and late signals of each n devices to occur at the same time, connector 24 is such that it introduces propagation delay proportional to its length and that the distance between 32($i$) and M is equal to the distance between 34($i$) and M, i ranging from 1 through n. It will be understood that clock skew will still be reduced even if such conditions are somewhat relaxed from that described above, which will provide more flexibility in semiconductor layout. All such variations are within the scope of the invention. The topology of the circuit in FIG. 1 has the advantage that clock skew can be minimized irrespective of the number of devices loading down connector 24 supplying an input clock signal to the network of devices. This is very different from the PLL designs where, as the number of clock signals to be provided increases, the skew between the different clock signals becomes larger. This is due to the additive effect on error tolerance of multiple PLL integrated circuits. If the PLL design is used instead of the topology of the circuit of FIG. 1, the tolerance of each stage of the n devices must be added into the total clock skew.

Figure 3:
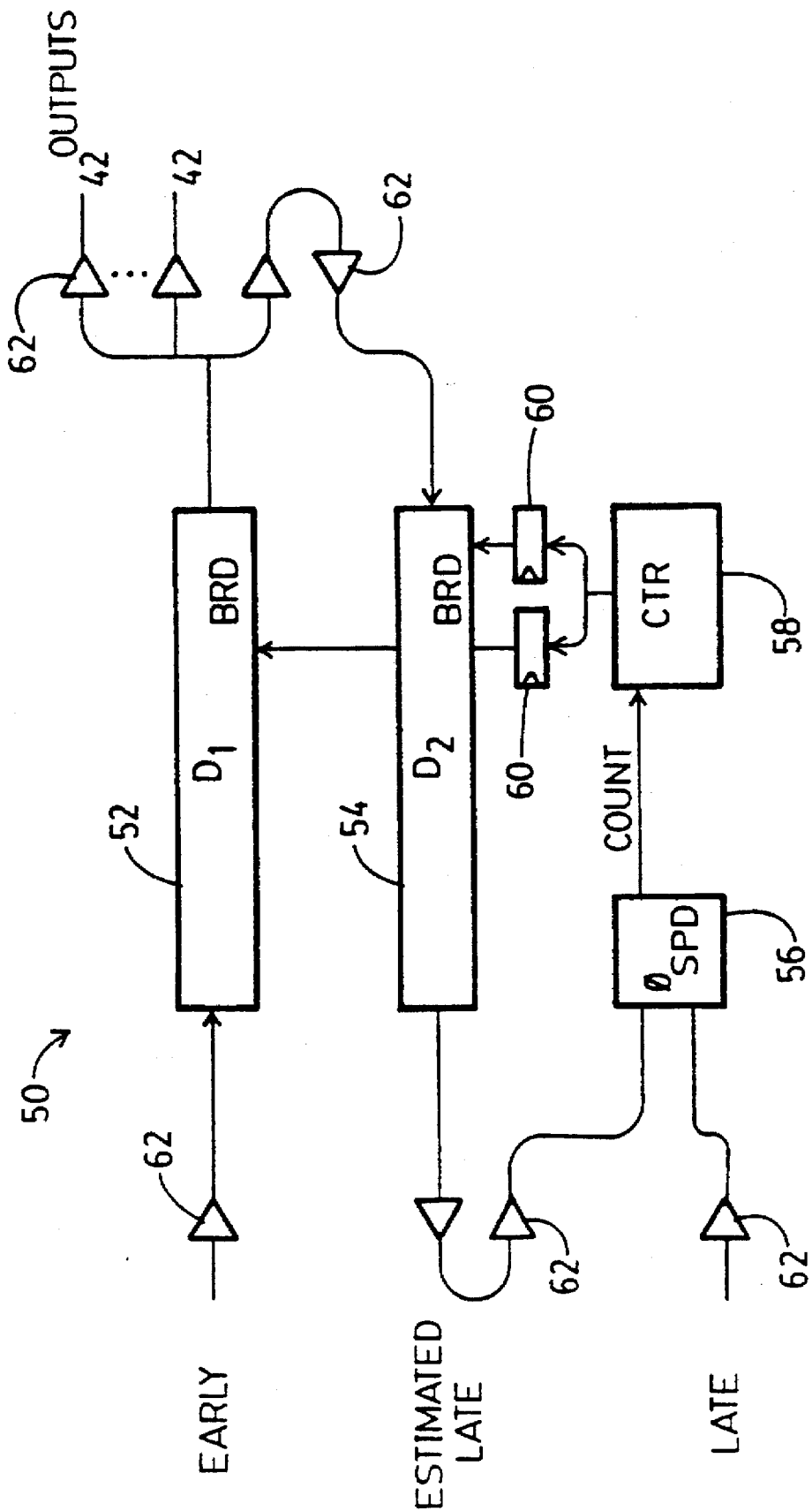
FIG. 3 is a block diagram of a circuit used in the distribution circuit of FIG. 1 to illustrate the generation of the low skew clock signals.

FIG. 3 is a block diagram for providing an output signal having a transition time occurring at the center or mean value between the transition times of the early and late signals of each of the n devices of FIG. 1. Thus, each of the n devices in FIG. 1 may include circuit 50 of FIG. 3, where circuit 50 receives as inputs the early and late signals received by the corresponding device 30 in FIG. 1. Circuit 50 includes two substantially identical delay lines 52, 54 connected in series for delaying the early clock signal so as to obtain a delayed early (or estimated late) signal at the output of delay line 54. If the delays introduced by delay lines 52, 54 are adjusted such that the delayed early clock signal at the output of line 54 has the same transition times as delayed clock signal received by circuit 50, then the output 42 of delay line 52 will have a transition time occurring at the mean value or center of transition times of the early and late clock signals. Thus, as shown in FIG. 3, the output of delay line 54 and the late clock signal are supplied to a phase detector 56 which compares the phases of the two input signals and provides a count signal to a counter 58 which provides a control signal proportional to the count in the counter to the delay lines 52, 54 through registers 60, in order to adjust the amount of delay introduced by the two delays by the same amount. Two registers 60 are provided to store the count provided by counter 58. In this manner, the amount of delay introduced by delay lines 52, 54 are adjusted by the same amount so that the delays introduced by the two delay lines remain equal.

The delay introduced by each of the two delay lines is adjusted until there is no phase difference between the delayed early clock signal (the estimated late clock signal) and the late clock signal. When this happens, the output 42 of delay line 52 will have a transition time occurring at the center or mean value between the transition times of the early and late clock signals supplied to circuit 50. As shown in FIG. 3, identical buffers 62 are employed in a symmetrical manner to avoid affecting the timing relationships described above. Since most counters are cyclical, it is unnecessary for detector 56 to specify whether to count up or down.

Figure 4A:
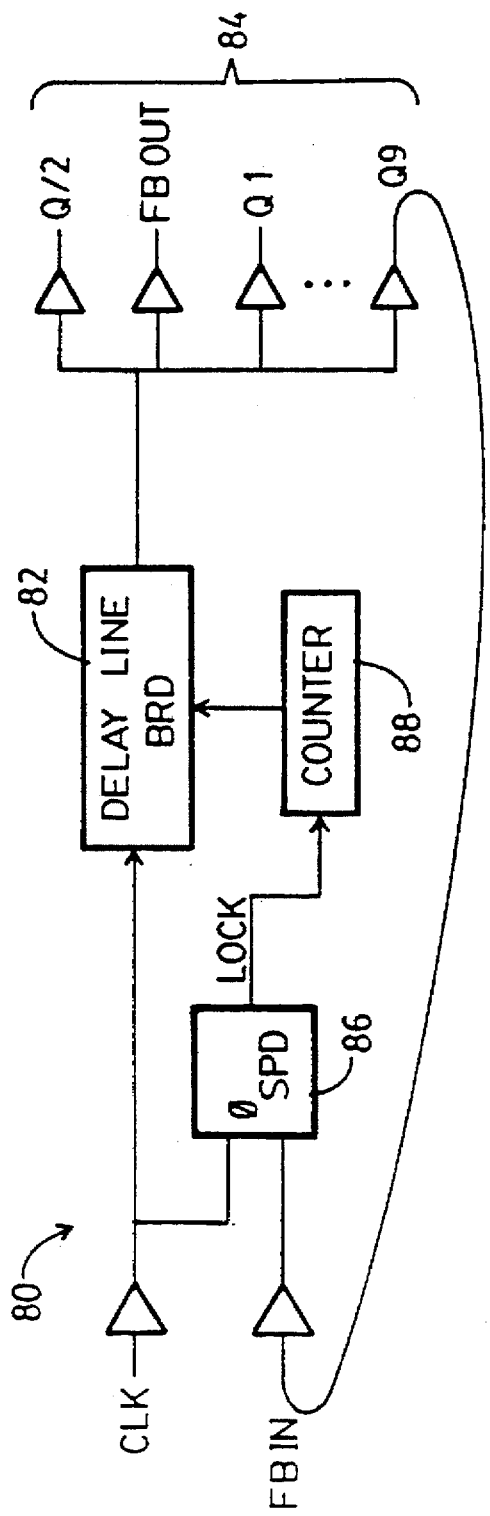
FIG. 4A is a block diagram of a circuit for delaying an input clock signal to provide a delayed clock signal and for matching the delayed clock signal to the input clock signal so that they have the same phase to illustrate an embodiment of the invention.
Figure 4B:
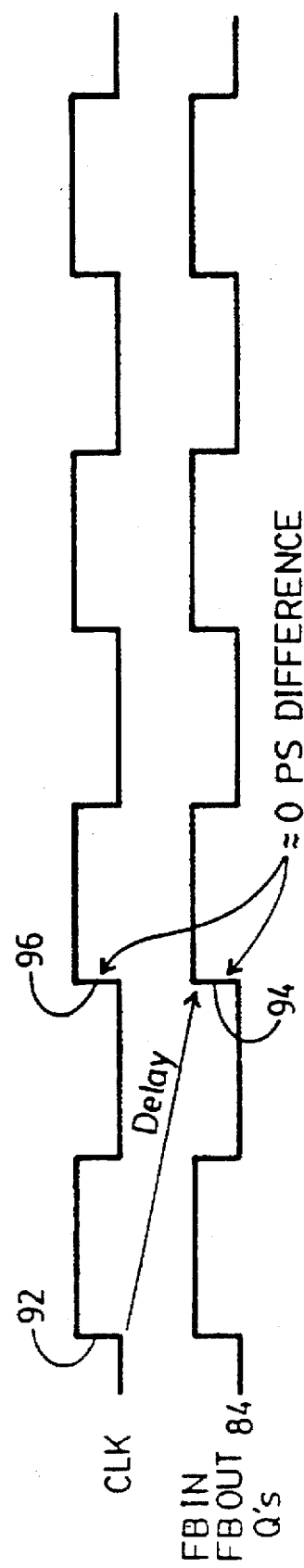
FIG. 4B is a timing diagram illustrating the operation of the circuit of FIG. 4A.

FIG. 4A is a block diagram of a circuit 80 for delaying an input clock signal and matching the phase between the input clock signal and the input clock. As shown in FIG. 4A, an input clock signal is delayed by delay line 82 to provide a number of output clocks 84. An output clock is fed back together with an input clock to a phase detector 86 which compares the phases of the output and input clocks to provide an output indicating the presence of a phase difference between them. This output is applied to counter 88 which provides a count to adjust the amount of delay introduced by delay line 82. Such adjustment is performed until the output 84 matches the phase of the input clock in which event detector 86 provides a lock signal to counter 88, causing the counter to stop counting. The operation of the circuit of FIG. 4A is illustrated in the timing diagram of FIG. 4B. As shown in FIG. 4B, if the input clock signal is delayed by delay line 82 by an integral clock cycle (or more integral clock cycles) such that the rising edge 92 of the input clock causes the rising edge 94 which coincides with the rising edge of the next input clock cycle 96, the input and output clocks are matched in transition times and there appears to be no phase difference between the two clocks.

Figure 5A:
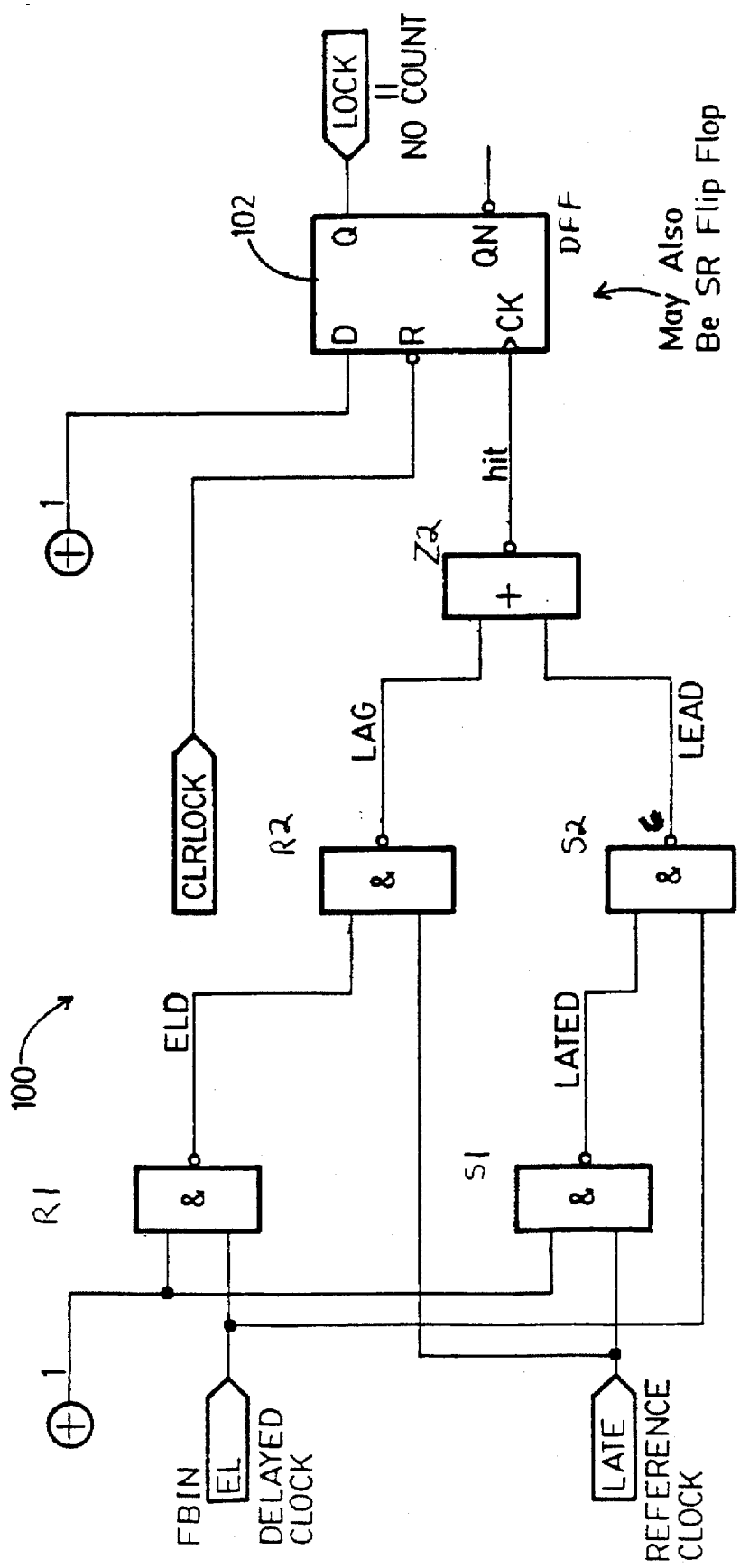
FIG. 5A is a schematic circuit diagram of a symmetric phase detector to illustrate an embodiment of the invention.

FIG. 5A is a schematic circuit diagram of a symmetric phase detector to illustrate the preferred embodiment of the invention. A phase detector may be implemented simply by using an exclusive OR-gate. With increasing demand for high speed clocks, however, phase detectors are required to be sensitive to short pulses. This may require that the exclusive OR-gate be implemented using fast gate technology, such as bipolar or gallium arsenide technology, while other parts of the circuits may still be implemented using ordinary IC processing technology. The use of such fast technologies increases the processing steps and therefore the cost of integrated circuits. This is undesirable. The phase detector of FIG. 5A includes five gates: R1, R2, S1, S2 and Z2. Together, these five gates are logically equivalent to an exclusive OR-gate. However, these five gates may be implemented using slower gates without requiring bipolar or gallium arsenide type fast gate technology.

As shown in FIG. 5A, phase detector 100 compares a delayed clock signal FBin and a reference clock Refclk. As shown in FIG. 5A, R1, R2, S1, S2 are NAND-gates. One input of each of gates R1, S1 is tied to a voltage at a high voltage "1" state. The remaining input of R1, S1 is supplied with FBin and Refclk respectively. ELD, the output of R1, is supplied together with Refclk to R2 which provides an output LAG. LATED, the output of S1, is supplied together with FBin to S2 which provides an output LEAD. The LAG, LEAD signals are then applied to NOR-gate Z2 which provides an output signal referred to as "hit" to the clock input of D flip-flop 102 whose D input is tied to the high logic state. When gate Z2 detects that the phase difference between the delay clock and the reference clock is greater than a threshold value, its output signal hit will not change logic state and the Q output "lock" signal of flip-flop 102 would not be set. If Z2 detects that the phase difference between the delay clock and the reference clock is below a predetermined threshold, Z2 would cause its output hit to change logic state, thereby also causing a transition in the Q output signal lock of flip-flop 102.

Therefore, when the phase detector 100 is substituted for the phase detectors 56 and 86 in FIGS. 3 and 4A, the lock or count signal would not be set when the phase detector detects a phase difference between the two input clock signals compared to be greater than a given threshold, so that counters 58 and 88 would continue to count and cause the delay line or lines controlled thereby to continue to adjust. However, if the phase difference between the two input signals compared by the phase detector is below a given threshold, a lock or count signal would then be set, thereby stopping the counting in the counters 58 and 88, which in turn cause the delay line or lines to stop adjusting their delay values.

Figure 5B:
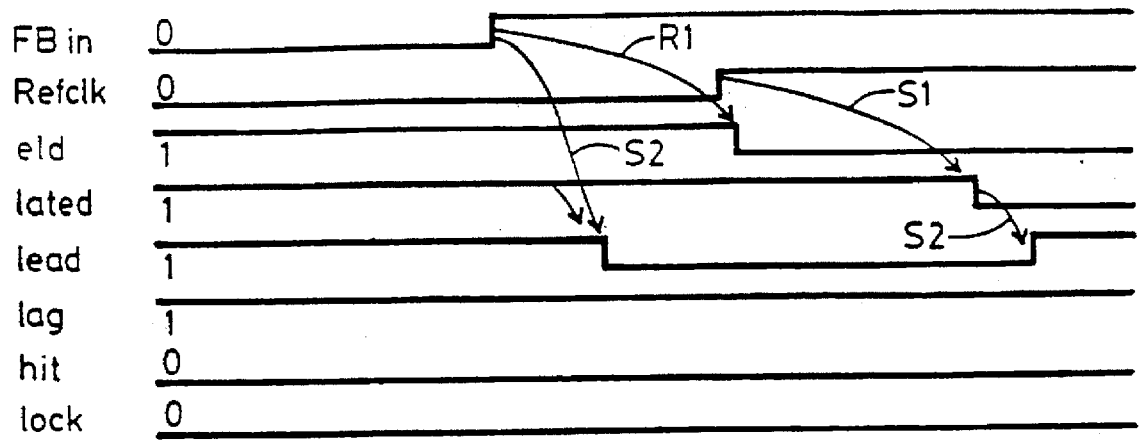
FIGS. 5B, 5C, 5D are timing diagrams to illustrate the operation of the detector of FIG. 5A.
Figure 5C:
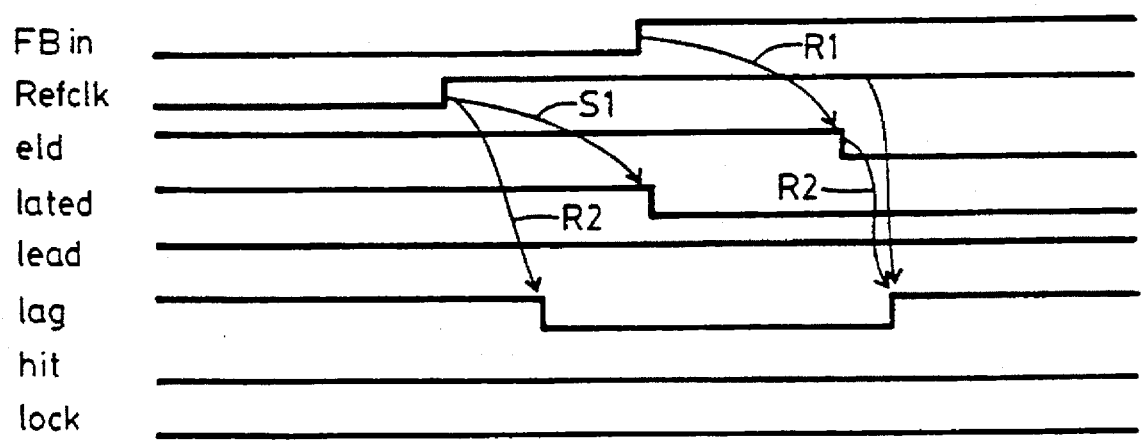
Figure 5D:
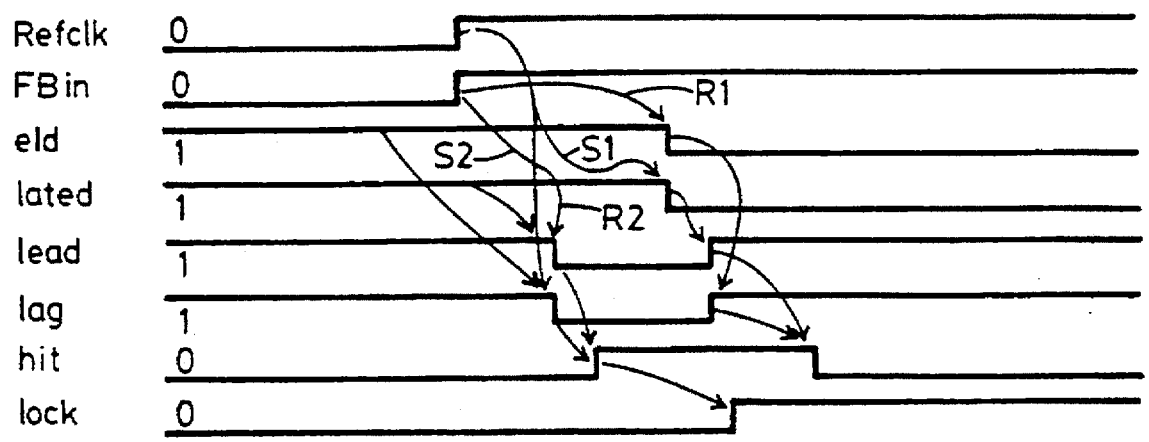

The operation of phase detector 100 is illustrated in more detail in a timing diagram of FIGS. 5B–5D. FIG. 5B is a timing diagram illustrating the situation where the delay clock FBin leads the reference clock Refclk by a value greater than the threshold of detector 100. Since one input of each of R1 and S1 is tied to the high logic state, these gates function simply as inverters. Therefore, when the delayed clock signal FBin rises, it causes ELD, the output of R1, to fall low. LATED, the output of S1, is initially at a logic high state, so that after a gate delay of S2, LEAD would also fall low in response to the rising edge of FBin. When the reference clock rises, there is a small time overlap during which the reference clock and ELD are both high. The gate R2, however, will require a minimum time period during which both inputs are high in order for gate R2 to respond. As indicated above, the five gates in detector 100 are implemented without using fast gate technology such as bipolar or gallium arsenide. Therefore, the small time period during which both inputs are high is inadequate to cause gate R2 to respond in order to force the LAG signal low. The LAG signal therefore remains high as shown in. FIG. 5B. Since the LAG signal remains high, the output hit signal of Z2 will remain low and unchanged so that the Q output signal lock of flip-flop 102 will also remain low and unchanged.

After a delay introduced by S1, the rising edge of Refclk causes LATED, the output of S1, to fall low, which in turn forces the output of S2, LEAD, high, so that the LEAD signal returns to its initial state. From FIG. 5B, it will be noted that, if the delay introduced by R1 is increased, the lock signal would be triggered and set despite the wide range of time differentials between the two clocks FBin and Refclk, resulting in a loss of resolution in detecting fine timing differences. Such result may actually be desirable in certain applications, such as telecommunication systems where the clocks are noisy.

FIG. 5C is a timing diagram of the different signals in FIG. 5A illustrating the operation of the detector of FIG. 5A, where the reference signal Refclk leads a delayed clock signal FBin. Again, by increasing the delays introduced by R1, S1, this will have the effect of reducing resolution.

FIG. 5D is a timing diagram of the different signals in FIG. 5A illustrating the operation of the detector in FIG. 5A, where the delayed clock signal and the reference clock occur at substantially the same time, or at a time difference that is lower than a predetermined threshold of detector 100. Since ELD and LATED are initially high, the rising edge of Refclk causes the LAG signal to fall low after a delay caused by gate R2 and the rising edge of the delayed clock signal FBin causes the LEAD signal to fall low after a delay introduced by gate S2. Therefore, both signals LEAD and LAG are low for an overlapping time period, thereby forcing the output of gate Z2 or hit to go high. This in turn causes the lock signal to go high. After a delay introduced by R1, ELD is caused to go low in response to the rising edge of FBin. Similarly, LATED is also forced low in response to Refclk after a delay caused by gate S1. The transitions in ELD and LATED in turn forces the signals LEAD and LAG high and these in turn causes the output of Z2 hit to go low.

If the delays introduced by R1, S1 are decreased, it will be seen that the signals LEAD and LAG will be forced high resulting in a shorter pulse width of the LEAD and LAG signals. If the delays introduced by R1, S1 are reduced by too much, the pulse widths of LEAD and LAG may be too short for the gate Z2 to register. In the preferred embodiments, the delay introduced by R1 and S1 is of the order of 1 ns. Preferably, R1 and S1 introduce essentially the same delay to ensure symmetrical detection of alignment. By using two pairs of identical gates R1, S1 and R2, S2, and by placing all gates close to each other, it is possible to minimize errors. Flip-flop 102 converts the narrow detection pulse hit into a lock signal at stable level indicating that synchronization or time alignment between the delayed clock signal and the reference clock signal has been achieved. By using the design of FIG. 5A instead of an exclusive OR-gate, it is possible to achieve a fine resolution which may be difficult to achieve without using bipolar or gallium arsenide technology.

Instead of NAND- and NOR-gates shown in FIG. 5A, other gates may also be used instead. Thus, gates R1, S1 may simply be inverters. Gates R2, S2 may be AND-gates instead and gate Z2 may be an AND- or NAND-gate. Obviously, other equivalent logic elements may be used as well. Such and other variations performing the same logic function and the other functions described above are within the scope of the invention.

Figure 6A:
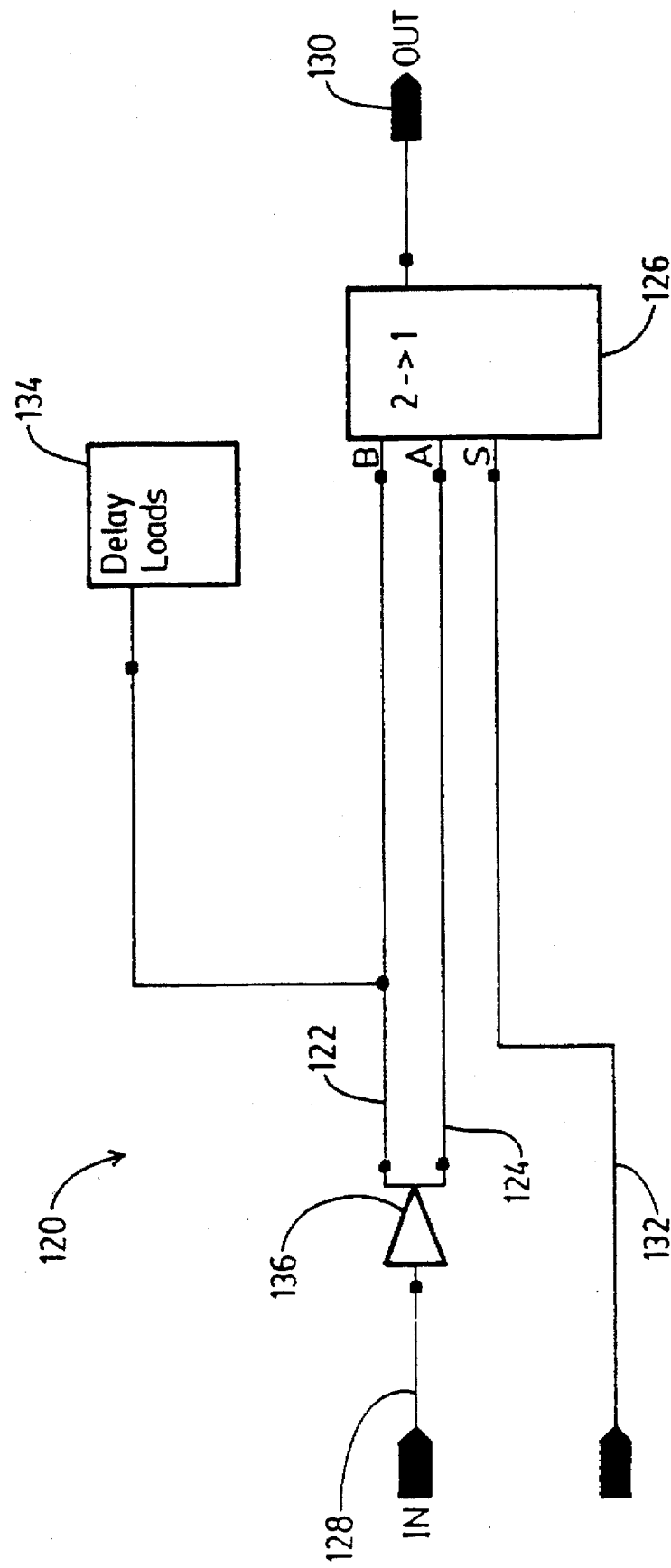
FIG. 6A is a schematic circuit diagram illustrating the use of circuit loading to create fine delay difference to illustrate an embodiment of the invention.

FIG. 6A is a schematic circuit diagram illustrating the use of circuit loading to create fine delay difference in an embodiment of the invention. Circuit 120 includes two substantially identical interconnect signal paths 122 and 124, each connected to a multiplexer 126 for selecting one of the paths for passing a signal between an input 128 and an output 130. The selection of one path or the other is chosen in accordance with an external selection signal on select line 132. Interconnect signal path 122 is connected and loaded by a delay load 134, which delays the propagation of a signal along line 122 relative to that along line 124. Therefore, by applying a proper select signal on line 132 to select either path 122 or 124 to pass the signal between input and outputs 128, 130, one is able to choose a signal path with or without the delay introduced by load 134.

In semiconductor processes, the interconnect metal capacitance is difficult to control. In device 120, paths 122 and 124 may be made of interconnect metal over a semiconductor substrate. By making paths 122, 124 as short as possible, and by making the two paths substantially identical in the design process, it is possible to minimize errors due to differences in interconnect metal capacitance. Instead of using a length of metal or other material such as polysilicon for causing delay, transistor gates are used instead in load 134 to cause a loading and delay to a signal propagating along path 122. Since transistor dimensions can be more tightly controlled compared to that of the interconnect metal in semiconductor processing, the design of circuit 120 achieves a much more accurate control of the delay introduced by one signal path relative to the other.

Figure 6B:
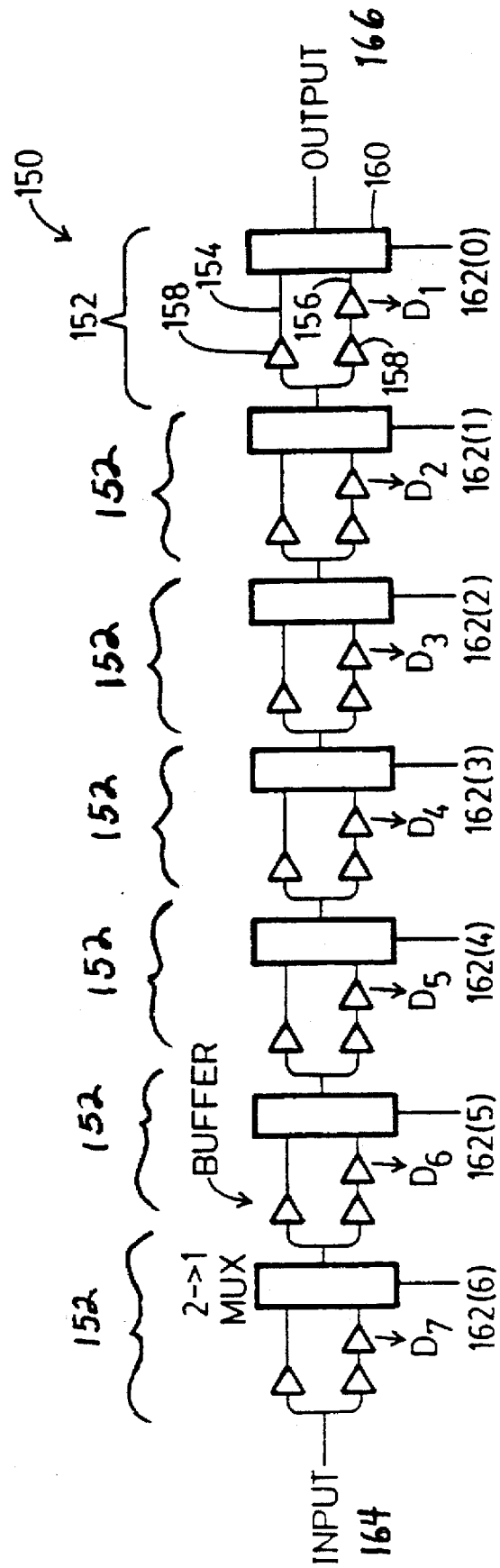
FIG. 6B is a schematic circuit diagram of a binary relative delay line structure with seven stages, each stage introducing a delay to illustrate an embodiment of the invention.

FIG. 6B is a schematic diagram of a binary relative delay line structure to illustrate the invention. As shown in FIG. 6B, delay line 150 includes seven stages, each of which may be a circuit similar to circuit 120 of FIG. 6A. As shown in FIG. 6B, each stage 152 differs from circuit 120 in that, instead of employing a common buffer 136 before the signal is split into two paths 122, 124 as shown in FIG. 6A, each stage 152 includes two parallel paths 154, 156, each of which employs one of two identical buffers 158. Each stage 152 also includes a load (one of the seven loads D1–D7) and a 2:1 multiplexer 160 (or any other type of signal selector) which is responsive to one of seven select signals on one of the seven select lines 162(0) through 162(6) for selecting one of the two paths 154, 156 for passing an input signal. The total delay introduced by the seven stages 150 between input 164 and output 166 is therefore the sum total of the delays introduced by the seven stages. Preferably, the delay introduced by one of the seven delay elements Di is twice that of the delay introduced by D(i−1), where i ranges from 1–7. One set of possible values of D1–D7 are as follows: 50 ps, 100 ps, 200 ps, 400 ps, 800 ps, 1.6 ns and 3.2 ns, respectively. With the above binary incremental relationship between the delays introduced by successive stages illustrated above, the amount of delay introduced between input and output 164, 166 may be controlled by applying a binary signal with seven digits, each digit being applied to one of the select lines 162(j), j ranging from 0–6. As shown in FIG. 6B, the output of multiplexer 160 in each stage is supplied to both signal paths of the next stage in the sequence. In the preferred embodiments, the two paths 154, 156 in each stage are metal interconnect paths and the load (one of D1–D7) is a semiconductor gate over a semiconductor substrate.

Figure 7:
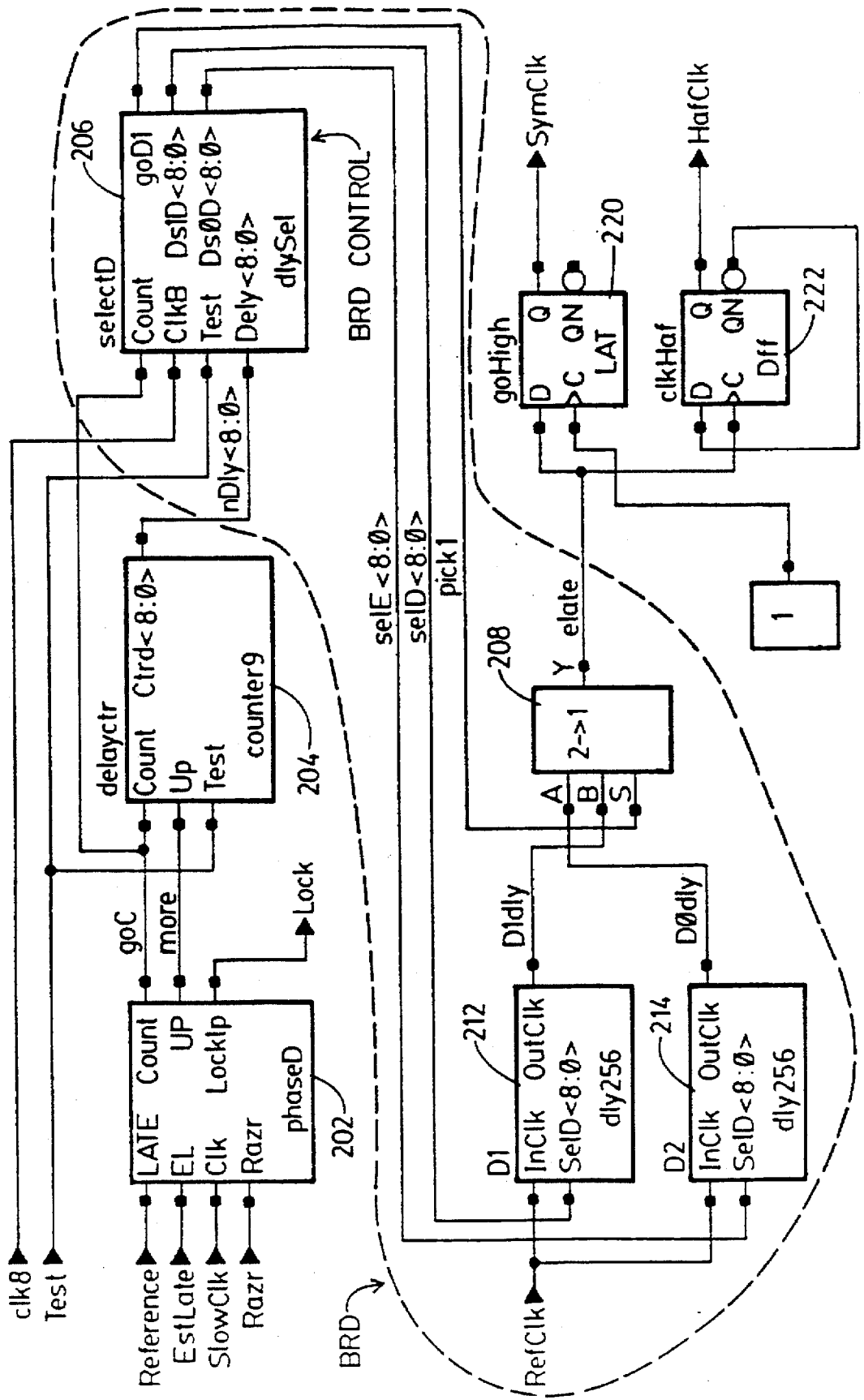
FIG. 7 is a block diagram of a binary relative delay circuit to illustrate an embodiment of the invention where a delay line is permitted to have adequate time to settle before it is selected for use.

FIG. 7 is a schematic circuit diagram of a binary relative delay line where one of two delay lines arranged in parallel may be selected to allow time for the delay line to settle before it is selected for signal processing. Also shown in FIG. 7 are other associated circuit components including a phase detector, a counter, a latch, and a divide by two circuit. As shown in FIG. 7, a phase detector 202 compares a reference signal to an estimated late (Estlate) signal and supplies a goC signal to counter 204, instructing the counter to count or to stop counting. Phase detector 202 also supplies a "more" signal to counter 204 to control the direction of counting. The output of counter 204, a 9-bit binary number, is applied to selection and delay determining circuit 206 which is operated at a clock rate of CLK8 slower than the clock signals being processed by the circuit 200 of FIG. 7; in one embodiment, CLK8 may simply be at a rate one-eighth that of the reference clock applied to detector 202. At such slower clock rate, control circuit 206 causes a select output "pick 1" at its terminal goD to toggle between 1 and 0, such signal being applied to multiplexer 208 to select the signals from one of the two delay lines 212 and 214 as the output of the multiplexer. Lines 212, 214 may be similar to line 150 in structure, but has nine stages instead of seven.

Control circuit 206 stores information concerning which delay line is currently selected so that it will generate a "pick 1" signal to cause the delay line that is not currently selected to be updated and then selected at the subsequent CLK8 clock intervals to allow time for the delay lines time to be updated and to settle. This is due to the fact that it takes time for delay line such as delay line 150 of FIG. 6B to settle after a set of binary signals is applied to select lines 162. The output of multiplexer 208 is then provided as a system clock through latch 220. The output is also supplied to a divide by two flip-flop 222 to supply a clock at half the frequency as that of the output of multiplexer 208.

Figure 8:
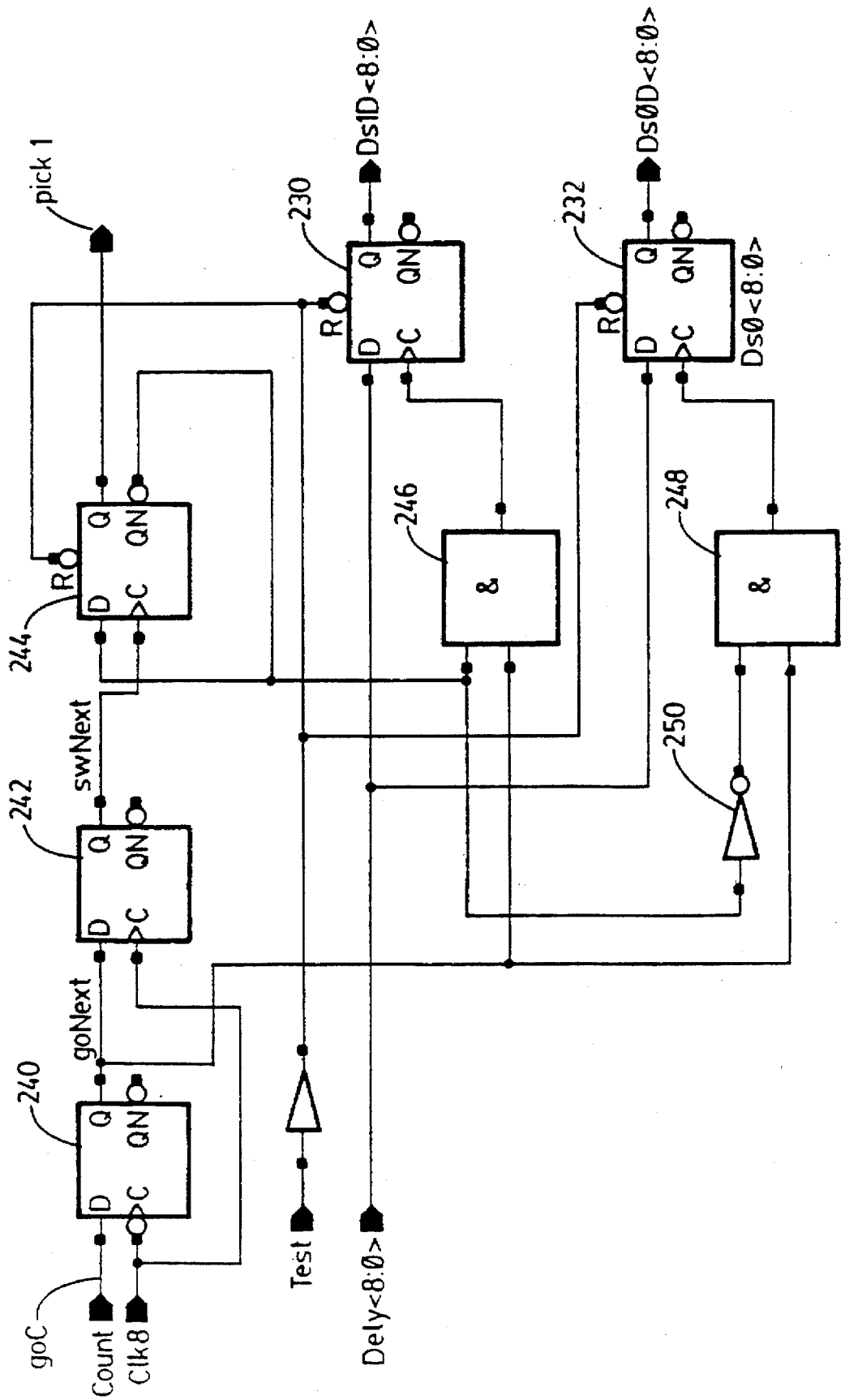
FIG. 8 is a schematic circuit diagram of the delay control function of FIG. 7.

FIG. 8 is a schematic circuit diagram illustrating one implementation of the control circuit 206 of FIG. 7. As shown in FIGS. 7 and 8, a 9-bit output of counter 204 is applied to two 9-bit registers 230 and 232 in parallel for storage. The goC signal from phase detector 202 propagates through three D flip-flops 240, 242, and 244 to generate the "pick 1" signal for application to multiplexer 208 in FIG. 7, and generate control signals for updating the registers 230, 232. The "goNext" signal at the output of flip-flop 240 is used to update the value of registers 230, 232.

Assume that in the initial state, the output Q of flip-flop 244, pick 1, is at a high logic state, so that when applied to multiplexer 208, the multiplexer would select the output of delay line 212 to be its output. In such state, the QN output of flip-flop 244 is at a low logic state, thereby causing the AND-gate 246 to have a low logic state output. The output of AND-gate 248 also provides a low logic state output, since goNext is at logic low in the initial state. Register 230 stores the 9-bit counter value to be applied to delay line 212 and register 232 stores the 9-bit counter value to be applied to delay line 214. When the phase detector 202 output goC goes high, after one cycle of clock signal CLK8, the output goNext of flip-flop 240 would go from low to high. This causes the output of AND-gate 248 to go from low to high also so that such rising edge applied to the register 232 enables the register to store the counter value from counter 204. The register 230 is unaffected since the other input of gate 246 remains low. At this time, the output pick 1 of control block 206 remains the same, so that multiplexer 208 is still selecting the output of delay line 212 to be its output. During the next clock interval of CLK8, the counter value stored in register 232 is applied to delay line 214, and allows time for delay line 214 to settle. During the clock interval subsequent to such next cycle of CLK8, the output swNext of flip-flop 242 follows the output of flip-flop 240 to high, thereby causing the output pick 1 of control block 206 to switch state to logic low, thereby causing multiplexer 208 to pass the output of delay line 214 instead of the output of delay line 212. The QN output of flip-flop 204 is also caused to switch states from low to high, thereby disabling AND-gate 248 and register 232. It enables AND-gate 246 so that, upon the goNext signal again going high, would cause register 230 to be ready to store the then current counter value. The above-described process is repeated so that flip-flop 244 always stores the logic level indicating which delay line is being selected currently. The control circuit of FIG. 8 then enables the proper register to store the counter value and the delay line connected thereto and not selected at the current time is permitted to settle before it is selected during the next time interval.

FIG. 9A is a block diagram of a circuit for providing an output clock signal having the same frequency as an input reference clock but at 50% duty cycle, where the input reference clock can be at any duty cycle. Circuit 300 includes two substantially identical delay lines 302, 304 connected in series to delay an input reference clock 306 which may be at any duty cycle. After passing through an input buffer 308, the reference clock is delayed by delay lines 302, 304 to result in a delayed reference clock. The delayed reference clock and the reference clock are applied to a phase detector 312 which provides a count signal to counter 314. In the same manner as that described above for detector 56 in FIG. 3, phase detector 312 provides a count signal to counter 314, so that counter 314 continues to count if the phase difference between the reference clock and the delayed reference clock are above certain thresholds. Counter 314 would count up or down, causing delay lines 302, 304 to change by substantially the same amount. It will be noted that it does not matter which direction the counter is counting since most binary counters are cyclical and will count back to the same desired number in either direction. In the same manner as that described above for detector 56, the delays introduced by lines 302, 304 are adjusted until the phase difference between the delayed reference clock and the reference clock is below a threshold.

FIG. 9B is a timing diagram illustrating the timing relationships in FIG. 9A after the delays introduced by lines 302, 304 are adjusted until the phase difference between the delayed reference clock and the reference clock is below a threshold. In reference to FIG. 9B, the time interval between rising edges 320, 322 of the D2 output of delay line 304 marks a complete cycle of the input reference clock, since the D2 output is in phase with the input reference clock. The rising edge 324 in D1 output of delay line 302 occurs at the halfway point between rising edges 320 and 322, since delay lines 302, 304 introduce substantially identical delays. Flip-flop 340 has its input connected to a voltage at a logic high state and has a clock input triggered by rising edge of the D2 output of delay line 304. Flip-flop 342 is similar to flip-flop 340 but has its inverted Q output applied to the reset terminal of flip-flop 340. Flip-flops 340, 342 are triggered by the rising edge of a clock signal applied to their clock inputs. Therefore, upon receiving the rising edge 320 from the D2 output, the Q output of flip-flop 340 would go high as edge 326. Upon receiving the rising edge 324, the inverted Q output of flip-flop 342, when applied to the reset terminal of flip-flip 340, causes the output of flip-flop 340 to fall low at edge 328. This process is then repeated so that the output of flip-flops 340 would appear at the inputs of the output buffers 344 as signal 340' in FIG. 9B. Since rising edge 324 occurs at the halfway point between rising edges 320 and 322 and falling edge 328 occurs at about the same time as rising edge 324, the signal 340' will have a 50% duty cycle at the same frequency as the input reference clock at 306.

A feedback path 346 includes a delay such as a buffer 348 from the inverted Q output of flip-flop 342 to its reset terminal, so that its output is reset to "0" at falling edge 350 after a predetermined delay so that circuit 300 is ready for the next rising edge of the reference clock 306.

While in the embodiment described above in reference to FIGS. 9A, 9B, flip-flops 340 and 342 trigger upon the rising edge of the reference clock, similar flip-flops that would trigger upon the falling edge may be used instead. In the embodiment in FIGS. 9A, 9B, delay line 302 is adjusted to delay the reference clock signal by half of the cycle time of the reference clock. Delay line 302 may be chosen to delay a different percentage of the cycle time so as to achieve a different duty cycle output clock. For example, delay line 302 may be chosen to delay (m/n) 100% of the cycle time of the reference clock, or (n−m)/n 100% of the cycle time. In either event, delay line 302 would delay a rising or falling edge of the reference clock by such portion of the cycle time to obtain a corresponding delayed edge of a delay signal. An output signal 340' is then provided which changes logic state upon the rising or falling edge of the input signal and upon the corresponding edge of the delayed signal. In the preferred embodiment in FIG. 9A, this is performed by delay line 304 which delays the corresponding delay edge at the output of delay line 302 by the difference between the cycle time of the reference clock and the delay introduced by delay line 302, such difference defining a complement delay. In the preferred embodiment, flip-flops 340 and 342 are included to cause the output 340' to change logic state upon the corresponding edge of the delayed signal provided as the output of delay line 302. The phase comparison performed by detector 312 and counter 314 are used to ensure that the combined effect of delay lines 302 and 304 is to delay the reference clock by integral numbers of reference clock cycles.

In order for delay line 302 to delay the reference clock by a fraction given by m/n or (n−m)/n of the cycle time of the reference clock 306, the relative delays caused by delay lines 302 and 304 may be chosen accordingly. Thus, if a 60% or 40% duty cycle is to be achieved, delay lines 302, 304 together may comprise five identical unit delay lines, where delay line 302 would include two of such unit delay lines connected in series and delay line 304 would comprise three such unit delay lines connected in series. Since a signal with 60% duty cycle is simply the complement of one with 40% duty cycle in the same frequency, alternatively delay line 302 may comprise three of such unit delay lines connected in series with delay line 304 comprising two of such unit delay lines connected in series. In a similar vein, digital periodic signals at the same frequency as the reference clock but with any ratio of (m/n) 100% duty cycle can be achieved, where m and n are positive integers, where n is greater than m.

Figure 10A:
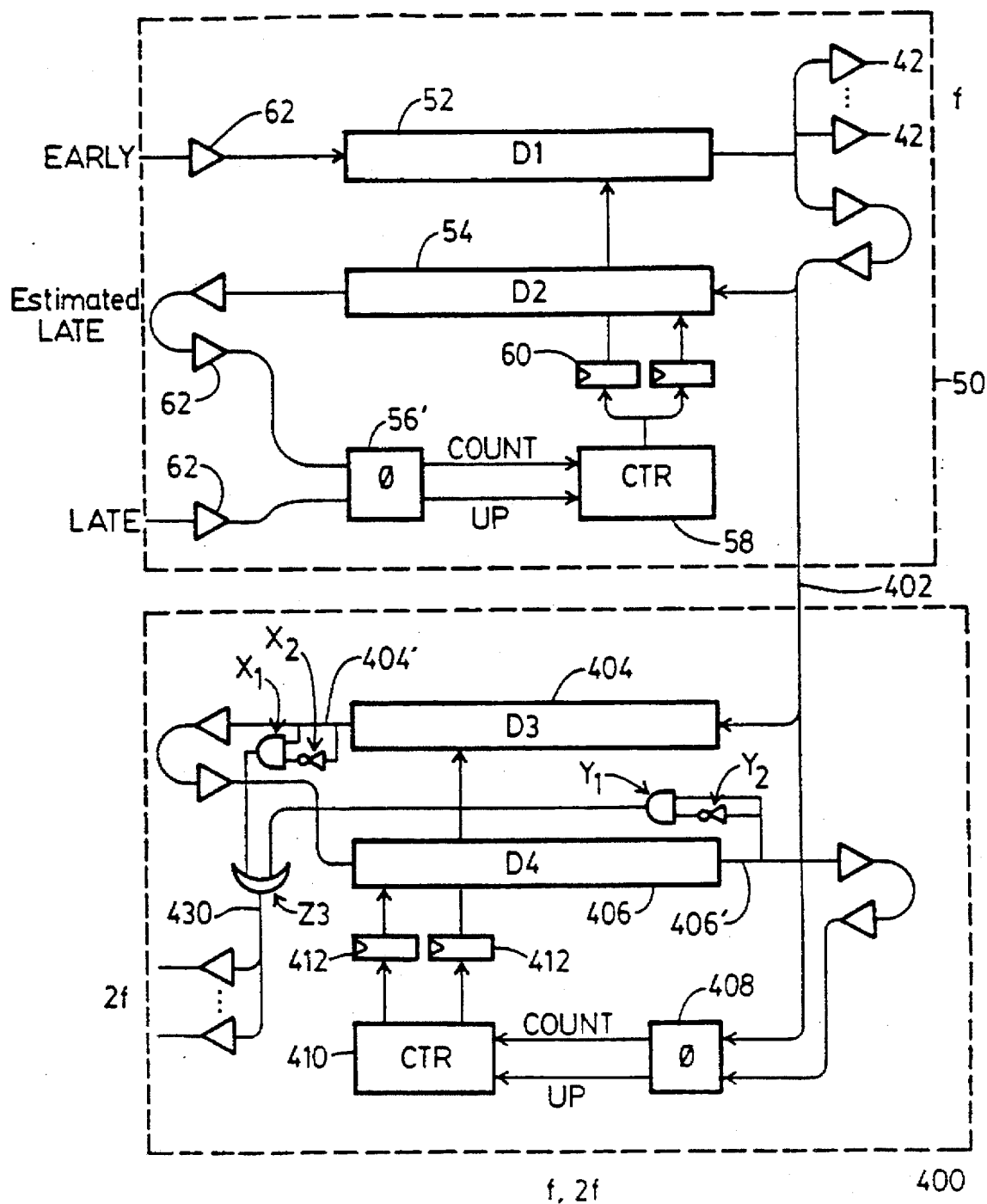
FIG. 10A is a block diagram of a circuit for generating a clock signal with a frequency that is a multiple of frequency of an input signal to illustrate an embodiment of the invention.

FIG. 10A is a block diagram of a circuit 400 for generating a periodic digital signal with a frequency that is a multiple of frequency of an input signal and of circuit 50' that is essentially the same as circuit 50 of FIG. 3. Circuit 50' differs from circuit 50 of FIG. 3 only in that phase detector 56' also supplies an "up" signal to counter 58 to indicate the direction of counting. Thus, circuit 50 supplies an input digital signal having frequency f on line 402 to circuit 400. Circuit 400 includes two substantially identical delay lines 404, 406 arranged in series, the output of delay line 406 is compared to the input signal by phase detector 408 with supplies "count" and "up" signals to counter 410. Counter 410 supplies its count through two registers 412 connected to delay lines 404, 406 in the same manner as that described above in reference to FIG. 3 for adjusting the delays introduced by delay lines 404, 406 until the phase difference between the output of delay line 406 and the input signal on line 402 is below a predetermined threshold. When this happens, the output of delay line 404 would delay the input signal by half of the cycle time of the input signal.

Figure 10B:
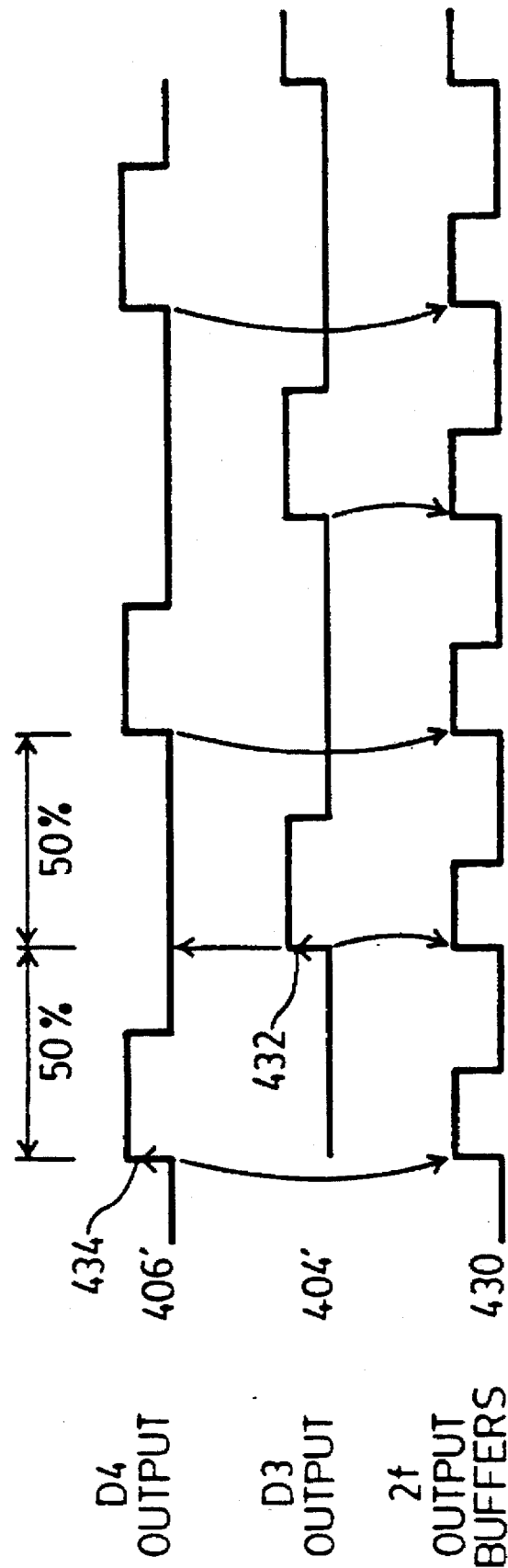
FIG. 10B is a timing diagram illustrating the operation of a circuit of FIG. 10A.

The output 404' of delay line 404 is connected to one input of an AND-gate X1 and through an inverter X2 to the other input of AND-gate X1. Similarly, the output 406' of delay line 406 is connected in a similar arrangement to AND-gate Y1 directly as well as through an inverter Y2. The effect of gates X1, X2 is to generate a pulse in response to a rising edge at output 404'. Similarly, gates Y1, Y2 would also generate a pulse in response to a rising edge at the output 406'. Such pulses are fed through an OR-gate Z3 in order to derive an output signal having a frequency 2f, that is twice that of the input signal on line 402. Such operation is illustrated in the timing diagram of FIG. 10B. As shown in FIG. 10B, a rising edge 432 at the output 404' would occur half the cycle time after a rising edge of the input signal which is in phase with edge 424 of the signal at 406'. The output pulse at 430 would include a pulse triggered by rising edge 434 and another pulse triggered by the rising edge 432 and similar pulses triggered by similar rising edges at 404' and the input signal. Since the output signals at 404', 406' are at frequency f, the output signal at 430 would occur at frequency 2f.

The circuit of FIG. 10A can be modified to achieve an output signal which is three times the input frequency by simply including an extra delay line substantially identical to the delay lines 404, 406 connected in series in between delay lines 404,406. An extra register would be included responsive to the count from counter 410 to adjust the delay by such delay line in the same manner as the control of delay lines 404, 406. Similar gate arrangements such as X1, X2 may be included for generating a pulse in response to a rising edge at the output of such third delay line where such pulse is combined by a three input OR-gate Z3' (not shown) to provide an output signal at three times the frequency of the input signal. In a similar vein, a digital clock signal with frequency at other integral multiples of the frequency of the input signal may be achieved as well and are within the scope of the invention.

While the invention has been described by reference to various preferred embodiments above, it will be understood that modification and changes may be made without departing from the scope of the invention which is to be limited only by the appended claims.

What is claimed is:

1. A binary relative delay line device comprising:

two delay lines, each of which delays, during a time interval, an input signal having a frequency applied to its input by a substantially equal amount of time, each of the delay lines requiring a time to settle before it is selected during a next time interval;

a selection and delay determining circuit coupled to the two delay lines which selects one of the two delay lines to provide an output signal;

a clock coupled to the selection and delay determining circuit which provides a clock signal to operate the selection and delay determining circuit at a lower frequency than the frequency of the input signal, the lower frequency being chosen so that any selected delay line has settled before it is selected;

a memory which stores delay values for the two delay lines, each delay line including a multiplexer which selects the value of the delay for that line; and a circuit which applies the stored delay values from the memory to the multiplexers to determine the delay values of the two delay lines.

2. The device of claim 1 wherein the circuit which applies the stored delay values includes an update circuit which updates the delay values stored in the memory.

3. The device of claim 2 wherein the circuit which applies the stored delay values and the update circuit are operated at the lower frequency.

4. The device of claim 1 wherein the memory is a register.

* * * * *